US010489688B2

(12) United States Patent
Shen et al.

(10) Patent No.: US 10,489,688 B2
(45) Date of Patent: Nov. 26, 2019

(54) PERSONALIZED DIGITAL IMAGE AESTHETICS IN A DIGITAL MEDIUM ENVIRONMENT

(71) Applicant: Adobe Inc., San Jose, CA (US)

(72) Inventors: Xiaohui Shen, San Jose, CA (US); Zhe Lin, Fremont, CA (US); Radomir Mech, Mountain View, CA (US); Jian Ren, Highland, NJ (US)

(73) Assignee: Adobe Inc., San Jose, CA (US)

( * ) Notice: Subject to any disclaimer, the term of this patent is extended or adjusted under 35 U.S.C. 154(b) by 147 days.

(21) Appl. No.: 15/658,265

(22) Filed: Jul. 24, 2017

(65) Prior Publication Data

US 2019/0026609 A1   Jan. 24, 2019

(51) Int. Cl.
   *G06K 9/62*   (2006.01)
   *G06K 9/46*   (2006.01)

(52) U.S. Cl.
   CPC ......... *G06K 9/6269* (2013.01); *G06K 9/4604* (2013.01); *G06K 9/6259* (2013.01)

(58) Field of Classification Search
   CPC ...... G06K 9/6269; G06K 9/4604; G06K 9/46; G06T 7/0002; G06T 7/90; G06T 2207/10024; G06T 2207/30168
   See application file for complete search history.

(56) References Cited

U.S. PATENT DOCUMENTS

| | | | | |
|---|---|---|---|---|
| 6,816,847 B1 * | 11/2004 | Toyama | ............. | G06K 9/00 382/156 |
| 2008/0285860 A1 * | 11/2008 | Datta | ............. | G06K 9/00624 382/224 |
| 2008/0304736 A1 * | 12/2008 | Nakagawa | ............. | A61B 5/0059 382/165 |
| 2013/0188866 A1 * | 7/2013 | Obrador | ............. | G06T 7/0002 382/165 |
| 2016/0140157 A1 * | 5/2016 | Li | ............. | G06F 17/30345 707/748 |
| 2016/0179844 A1 * | 6/2016 | Shen | ............. | G06F 16/5838 382/156 |
| 2017/0076474 A1 * | 3/2017 | Fu | ............. | G06T 11/00 |

(Continued)

OTHER PUBLICATIONS

Abe,"Query Learning Strategies using Boosting and Bagging", In Machine Learning: Proceedings of the Fifteenth International Conference (ICML'98),, Jul. 24, 1998, 9 pages.

(Continued)

*Primary Examiner* — Mekonen T Bekele
(74) *Attorney, Agent, or Firm* — SBMC

(57) ABSTRACT

Techniques and systems are described to determine personalized digital image aesthetics in a digital medium environment. In one example, a personalized offset is generated to adapt a generic model for digital image aesthetics. A generic model, once trained, is used to generate training aesthetics scores from a personal training data set that corresponds to an entity, e.g., a particular user, group of users, and so on. The image aesthetics system then generates residual scores (e.g., offsets) as a difference between the training aesthetics score and the personal aesthetics score for the personal training digital images. The image aesthetics system then employs machine learning to train a personalized model to predict the residual scores as a personalized offset using the residual scores and personal training digital images.

20 Claims, 10 Drawing Sheets

(56) References Cited

U.S. PATENT DOCUMENTS

| | | | | |
|---|---|---|---|---|
| 2017/0294010 A1* | 10/2017 | Shen | .................. | G06T 7/0002 |
| 2017/0357717 A1* | 12/2017 | Hughes | ............... | G06F 17/212 |
| 2017/0358090 A1* | 12/2017 | Li | ........................ | G06T 7/11 |

OTHER PUBLICATIONS

Bronstad,"Beauty is in the 'we' of the beholder: Greater agreement on facial attractiveness among close relations", Nov. 7, 2007, pp. 1674-1681.

Burbidge,"Active Learning for Regression based on Query by Committee", In International Conference on Intelligent Data Engineering and Automated Learning, Dec. 16, 2007, 10 pages.

Castro,"Faster Rates in Regression Via Active Learning", In Advances in Neural Information Processing Systems, Jun. 2005, 46 pages.

Chang,"Training nu-support vector regression: theory and algorithms", Neural Computation,14(8):, Aug. 2002, 26 pages.

Demir,"A multiple criteria active learning method for support vector regression", Pattern recognition, 47(7):, Feb. 13, 2014, 3 pages.

Dhar,"High Level Describable Attributes for Predicting Aesthetics and Interestingness", In Proceedings CVPR, 2011, 2011, pp. 1657-1664.

Ioffe,"Batch Normalization: Accelerating Deep Network Training by Reducing Internal Covariate Shift", Mar. 2015, 11 pages.

Kang,"Convolutional neural networks for no-reference image quality assessment", In Proceedings of the IEEE Conference on Computer Vision and Pattern Recognition,, Jun. 23, 2014, 8 pages.

Ke,"The Design of High-Level Features for Photo Quality Assessment", In Proceedings CVPR, 2006, 2006, 8 pages.

Kong,"Photo Aesthetics Ranking Network with Attributes and Content Adaptation", Sep. 2016, 16 pages.

Koren,"Matrix factorization techniques for recommender systems", In IEEE journal of Computer vol. 42, issue 8, Aug. 2009, pp. 42-49.

Lee,"Algorithms for Non-negative Matrix Factorization", in NIPS 13, 2001, 2001, 7 pages.

Lu,"Deep Multi-Patch Aggregation Network for Image Style, Aesthetics, and Quality Estimation", In Proceedings of the IEEE International Conference on Computer Vision, Dec. 2015, 9 pages.

Lu,"RAPID: Rating Pictorial Aesthetics using Deep Learning", ACM Multimedia, 2014., 2014, 10 pages.

Luo,"Content-Based Photo Quality Assessment", In 2011 International Conference on Computer Vision, Dec. 1, 2013, 8 pages.

Mai,"Composition-preserving Deep Photo Aesthetics Assessment", In Proceedings of the IEEE Conference on Computer Vision and Pattern Recognition,, Dec. 27, 2016, 10 pages.

Marchesotti,"Assessing the aesthetic quality of photographs using generic image descriptors", In 2011 International Conference on Computer Vision, Nov. 6, 2011, pp. 1784-1791.

Marchesotti,"Discovering beautiful attributes for aesthetic image analysis", Computer Vision and Pattern Recognition IJCV, 2014, Dec. 16, 2014, 22 pages.

Murray,"Ava: A largescale database for aesthetic visual analysis", In Computer Vision and Pattern Recognition (CVPR), 2012 IEEE, Nov. 6, 2011, 8 pages.

O'Donovan,"Collaborative Filtering of Color Aesthetics", In Proceedings of the Workshop on Computational Aesthetics, Aug. 8, 2014, 8 pages.

Rothe,"Some like it hot—visual guidance for preference prediction", Mar. 10, 2016, 9 pages.

Schohn,"Less is More: Active Learning with Support Vector Machines", Jun. 29, 2000, 8 pages.

Settles,"Active Learning Literature Survey", Jan. 9, 2009, 46 pages.

Tong,"Support Vector Machine Active Learning with Applications to Text Classification", Nov. 1, 2001, 22 pages.

Vessel,"Personalized Visual Aesthetics", International Society for Optics and Photonics, 2014., Feb. 25, 2014, 8 pages.

Wang,"Brain-Inspired Deep Networks for Image Aesthetics Assessment", Mar. 15, 2016, 16 pages.

Yeh,"Personalized Photograph Ranking and Selection System", In Proceedings of the 18th ACM international conference on Multimedia,, Aug. 23, 2010, 10 pages.

\* cited by examiner

900

Algorithm 1: Active-PAM

Input: Unrated photo set $\mathcal{N} = \{p_i\}_{i=1,K}$, the aesthetic feature vectors $v_i$, the maximum number of example ratings $m$;

1. Initialize the set of rated examples as: $\mathcal{R} = \emptyset$;
2. Randomly select a subset $S$ of $\lfloor K/10 \rfloor$ images from $\mathcal{N}$ and move them to $\mathcal{R}$: $\mathcal{N} = \mathcal{N} \setminus S, \mathcal{R} = \mathcal{R} \cup S$;
3. while $|\mathcal{R}| < m$ do
4.     Train a regressor to predict the residual score $\{r_i\}$;
5.     Calculate the weight for each annotated image $$w_i = (1 - \frac{|r_i|}{\sum_{i=1}^{|\mathcal{R}|}(|r_i|)}), p_i \in \mathcal{R} \quad (2)$$

6.     Find $p_q$ that $$\max_q \sum_{j=1}^{|\mathcal{R}|} w_j dist(v_q, v_j), p_q \in \mathcal{N}, p_j \in \mathcal{R} \quad (3)$$

7.     Add the selected image to $R$ and update $N$:
    $\mathcal{R} = \mathcal{R} \cup \{p_q\}$ and $\mathcal{N} \setminus p_q$;

*Fig. 9*

PERSONALIZED DIGITAL IMAGE AESTHETICS IN A DIGITAL MEDIUM ENVIRONMENT

BACKGROUND

Automatic estimation of digital image aesthetics by a computing device is used to support a wide variety of functionality. In an image curation example, digital image aesthetics estimation is used by the computing device to collect and group digital images that are visually pleasing. In an image search example, digital image aesthetics estimation is used by the computing device to rank digital images in a search result based on how visually pleasing the images are likely to appear to a user. Other examples include generation of creative recommendations and image editing suggestions. In this way, the estimation of digital image aesthetics may be used by a computing device to increase likelihood to providing an image result that is of interest to a user.

Conventional techniques employed by a computing device rely on a generic (e.g., universal) model to estimate digital image aesthetics. However, visual preferences may vary greatly from one user to another. A first user, for instance, may prefer lighting conditions, image scenes, and so forth that differ from that of a second user. Accordingly, these conventional techniques may lack accuracy when applied to a diverse range of users, which then has an effect on other functionality that relies on these techniques, such as image curation and image search as described above.

SUMMARY

Techniques and systems are described to determine personalized digital image aesthetics in a digital medium environment. In one example, a personalized offset is generated to adapt a generic model for digital image aesthetics. This acts to personalize a generic aesthetics score that use of the personalized offset to form a personalized aesthetics score. In this way, computational resources may be conserved by adapting a generic model trained using a large data set for use by a respective entity, e.g., particular user.

A generic model, for instance, is first trained by an image aesthetics system using a generic training data set that includes training digital images and user aesthetic scores assigned to the respective images. The generic model, once trained, is then used to generate training aesthetics scores from a personal training data set that corresponds to an entity, e.g., a particular user, group of users, and so on. The image aesthetics system then generates residual scores (e.g., offsets) as a difference between the training aesthetics score and the personal aesthetics score for the personal training digital images. The image aesthetics system then employs machine learning to train a personalized model to predict the residual scores as a personalized offset using the residual scores and personal training digital images. In this way, the generic model generated from the large generic training data set is adapted for a particular entity by a personalized offset generated by a personalized model. This results in efficient use of computational resources as personalized models may be trained by the image aesthetics system for a multitude of entities using relatively small personal training data sets that leverage the generic model that is trained using a relative large generic training data set.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 9 depicts an example of an algorithm usable to train a regressor.

DETAILED DESCRIPTION

Overview

Figure 1:
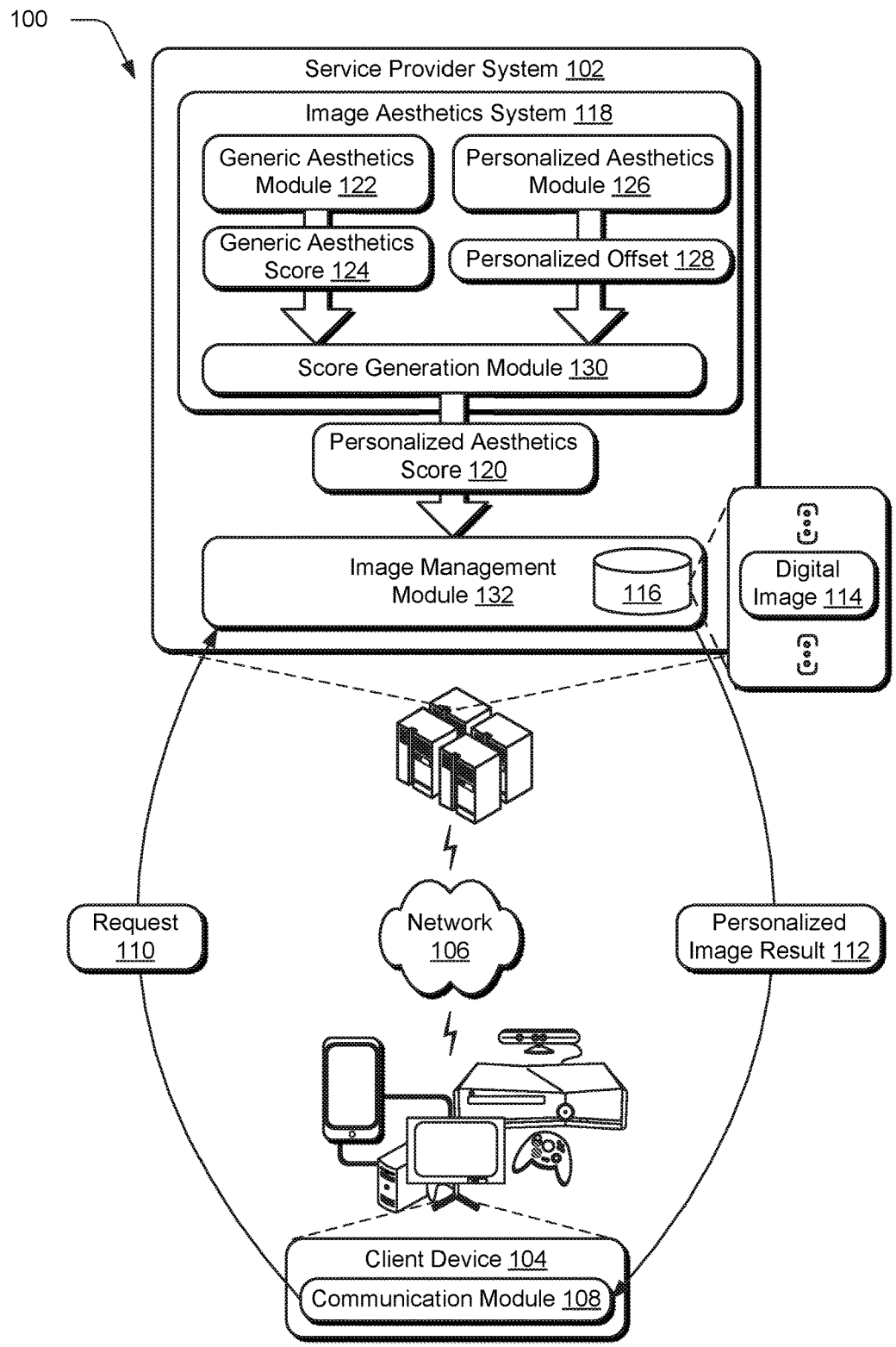
FIG. 1 is an illustration of an environment in an example implementation that is operable to employ personalized digital image aesthetics techniques described herein.

Automated techniques to assess digital image aesthetics by a computing device support a variety of functionality, examples of which include image search, creative recommendations, image ranking, image curation (e.g., to generate photo albums), and so forth. Conventional techniques to do so, however, rely on a generic model that has a limited ability to address the wide range of visual preferences of users and thus may lack accuracy in practice.

Accordingly, techniques and systems are described to determine personalized digital image aesthetics in a digital medium environment. In one example, a personalized offset is generated to adapt a generic model for digital image aesthetics. This acts to personalize a generic aesthetics score through use of the personalized offset to form a personalized aesthetics score. In this way, computational resources may be conserved by adapting a generic model trained using a large data set for use by a respective entity, e.g., particular user.

A generic model, for instance, is first trained by an image aesthetics system using a generic training data set that includes training digital images and user aesthetic scores assigned to the respective images. The generic training data set, for instance, may include forty thousand digital images labeled by a diverse group of users through interaction with a computing device. Thus, the generic training data set may provide a rich description of aesthetics that are used to train the generic model by the image aesthetics system.

The generic model, once trained, is then used to generate training aesthetics scores from a personal training data set that corresponds to an entity, e.g., a particular user, group of users, and so on. The personal training data set, for instance, may include personal training digital images and personal aesthetics scores specified by the entity. The personal training data set may have a limited size in comparison to the generic training data set, e.g., a few user photo albums.

Accordingly, the image aesthetics system is configured to generate residual scores (e.g., offsets) as a difference between the training aesthetics score and the personal aesthetics score for the personal training digital images. The image aesthetics system then employs machine learning to train a personalized model to predict the residual scores as a personalized offset using the residual scores and personal training digital images. In this way, the generic model generated from the large generic training data set is adapted for a particular entity by a personalized offset generated by a personalized model. This results in efficient use of computational resources as personalized models may be trained by the image aesthetics system for a multitude of entities using relatively small personal training data sets that leverage the generic model that is trained using a relative large generic training data set.

Once both the generic and personalized models are trained, the image aesthetics system may then generate personalized aesthetics scores for subsequent digital images, e.g., digital image that are not used as part of training. The generic model, for instance, is used to generate a generic aesthetics score for the digital image. The personalized model is used to generate a personalized offset for the digital image, which may be selected to correspond to a particular entity, for which, the personalized aesthetics score is be generated. The personalized offset is then applied by the image aesthetics system to the generic aesthetics score to determine a personalized aesthetics score for the digital image. As previously described, this score may be used to support a variety of functionality, such as image curation, image search, ranking, and so forth. In this way, the image aesthetics system may efficiency personalize image aesthetics for a particular entity. Additional image aesthetics techniques may also be employed to improve efficiency and accuracy, examples of which include active learning and use of content and aesthetics attributes to generate the personalized model as further described in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ personalized digital image aesthetics techniques described herein. The illustrated environment 100 includes a service provider system 102 and a client device 104 that are communicatively coupled via a network 106. Computing devices that implement the service provider system 102 and the client device 104 may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as described in FIG. 10.

The client device 104 is illustrated as including a communication module 108 that is representative of functionality to communicate via the network 106, e.g., with the service provider system 102 using a browser, network-enabled application, operating system, and so forth. The communication module 108, for instance, may form a request 110 for communication via the network 106 to the service provider system 102 and receive a personalized image result 112 in response. The personalized image result 112 may take a variety of forms, such as a result of image curation (e.g., a personalized photo album), image search result, creative recommendation (e.g., instructions and examples to guide digital image creation), image editing suggestions, and so forth. Thus, the personalized image result 112 may include digital images 114 selected from a storage device 116 and/or instructions to create or modify digital images.

In order to generate the personalized image result 112, the service provider system 102 employs an image aesthetics system 118 to generate a personalized aesthetics score 120. The image aesthetics system 118 includes a generic aesthetics module 122 configured to generate a generic aesthetics score 124 for the digital image 114. The generic aesthetics module 122, for instance, may employ a generic model trained using machine learning from a generic training data set as described in relation to FIG. 2 to generate the generic aesthetics score 124.

The image aesthetics system 118 also includes a personalized aesthetics module 126 that is configured to generate a personalized offset 128 from the digital image 114. The personalized offset 128, for instance, is generated using a personalized model trained using a personal training data set, e.g., a set of photo albums having personal training digital images rated using personal aesthetics scores. The personalized model, for instance, is trained to learn an offset between personal aesthetics scores specified by the entity with training aesthetics scores generated by the generic model for the personal training digital images as described in relation to FIG. 3.

The personalized offset 128 may thus be used by a score generation module 130 to adapt the generic aesthetics score 124 to generate the personalized aesthetics score 120. The score generation module 130, for instance, may generate the personalized aesthetics score 120 by applying the personalized offset 128 to the generic aesthetics score 124 to form the personalized aesthetics score 120 for the digital image 114. The personalized aesthetics score 120 is then used by an image management module 132 to generate a personalized image result 112, such as to curate or rank the digital image 114, e.g., as part of an image search result. In this way, a generic model trained using a multitude of digital images may be adapted for use in generating a personalized aesthetics score 120.

In the following description, a first section describes training of the generic and personalized models in relation to FIGS. 2-4. A second section follows that describes use of the trained generic and personalized models to generate a personalized aesthetics score for an entity, which is described in relation to FIGS. 5-6. Sections also follow that describe training and use of the personalized model to address aesthetic and content attributes as well as active learning techniques that are usable to generate the personal training data set to increase accuracy of the personalized model.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Generic and Personalized Model Training

Figure 2:
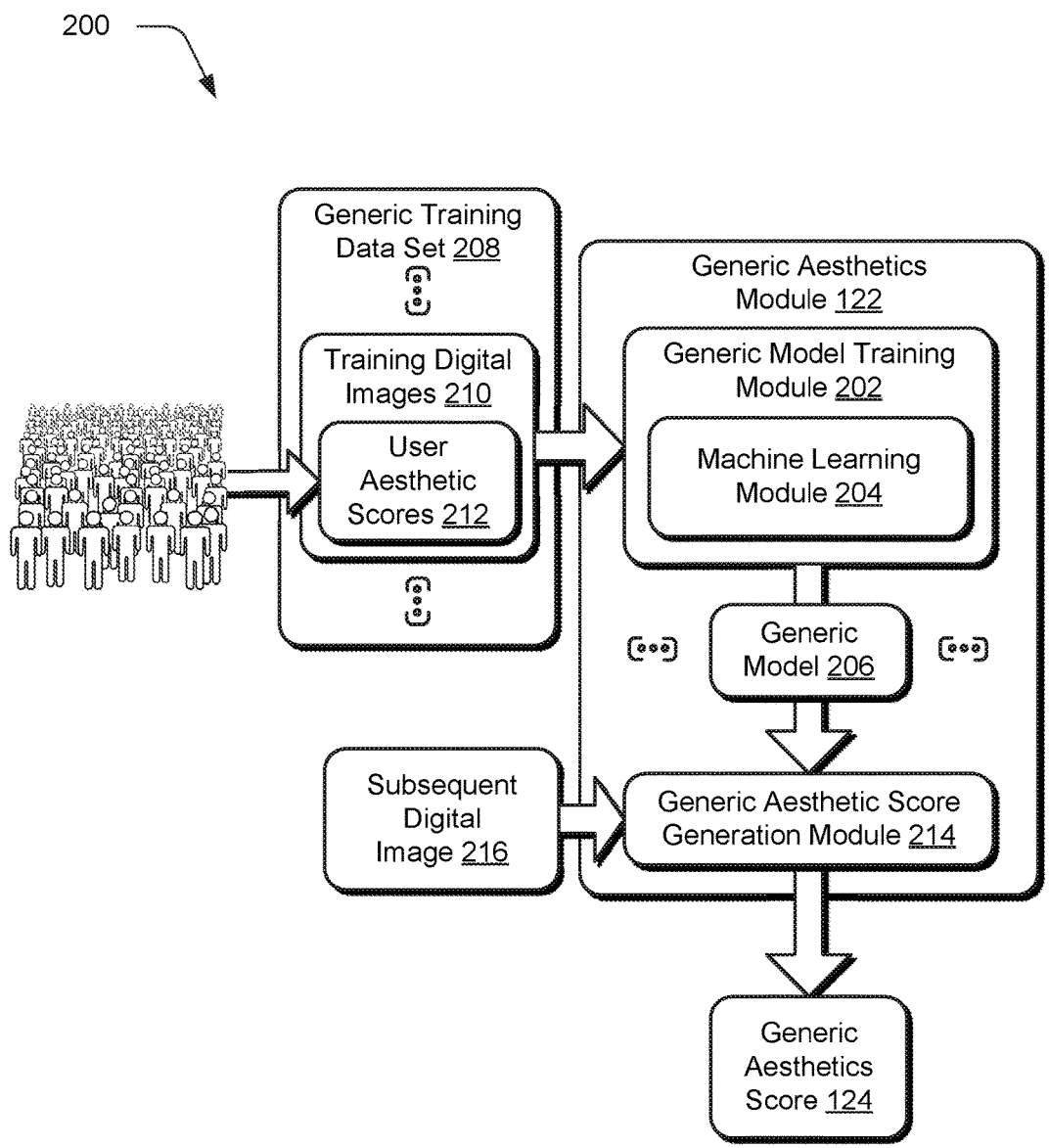
FIG. 2 depicts a system in an example implementation in which at least one generic model is trained by a generic aesthetics module of FIG. 1 using machine learning based on a generic training data set.

FIG. 2 depicts a system 200 in an example implementation in which at least one generic model is trained by a generic aesthetics module 122 of FIG. 1 using machine learning based on a generic training data set. FIG. 3 depicts a system 300 in an example implementation in which at least one personalized model is trained by a personalized aesthetics module 126 of FIG. 1 using machine learning based on a personal training data set and the generic model of FIG. 2. FIG. 4 depicts a procedure 400 in an example implementation of training generic and personalized models using machine learning.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-4.

To begin, at least one generic model is trained using machine learning based on a generic training data set (block 402). The generic aesthetics module 122 is illustrated in FIG. 2 as including a generic model training module 202. The generic aesthetics module 122 is configured to employ a machine learning module 204 to train at least one generic model 206 using machine learning (e.g., a neural network) based on a generic training data set 208. The generic training data set 208, for instance, may include a multitude (e.g., forty thousand) of training digital images 210, each having at least one user aesthetics score 212. The user aesthetics scores 212 may be input via a user interface to rate each of the training digital images 210 on a scale of one to five, each by a subset of users. The user aesthetics scores 212 describe an overall amount that the respective training digital images 210 are considered to have "good" aesthetics, e.g., are visually pleasing.

The user aesthetics scores 212 may also be provided for different attributes, such as content attributes or aesthetics attributes. Content attributes refer to attributes of content included as part of the training digital images 210, such as landscape, crowd, architecture, man-made structure, man-made objects, ocean/lake, transportation, people plants, animals, sports, and so on. Aesthetics attributes refer to attributes of aesthetics of the training digital images 210, such as vivid color, lighting, interesting content, symmetry, shallow depth of focus, object emphasis, balancing elements, color harmony, repetition, rule of thirds, and so forth. Thus, user aesthetics scores 212 may be received to rate these different attributes, which are then used along with the training digital images 210 to train respective generic models 206, e.g., each of a respective one of the different attributes. Further discussion of content and aesthetics attributes is described in relation to a corresponding section.

The generic model 206, once trained, may then be used by a generic aesthetic score generation module 214 to generate the generic aesthetics score 124 for a subsequent digital image 216, e.g., a digital image that is not included as part of the generic training data set 208. In other words, the generic model 206 is thus trained to generate the generic aesthetics score 124 automatically and without user intervention for a subsequent digital image 216. This may be leveraged as part of personalization as further described below.

Figure 3:
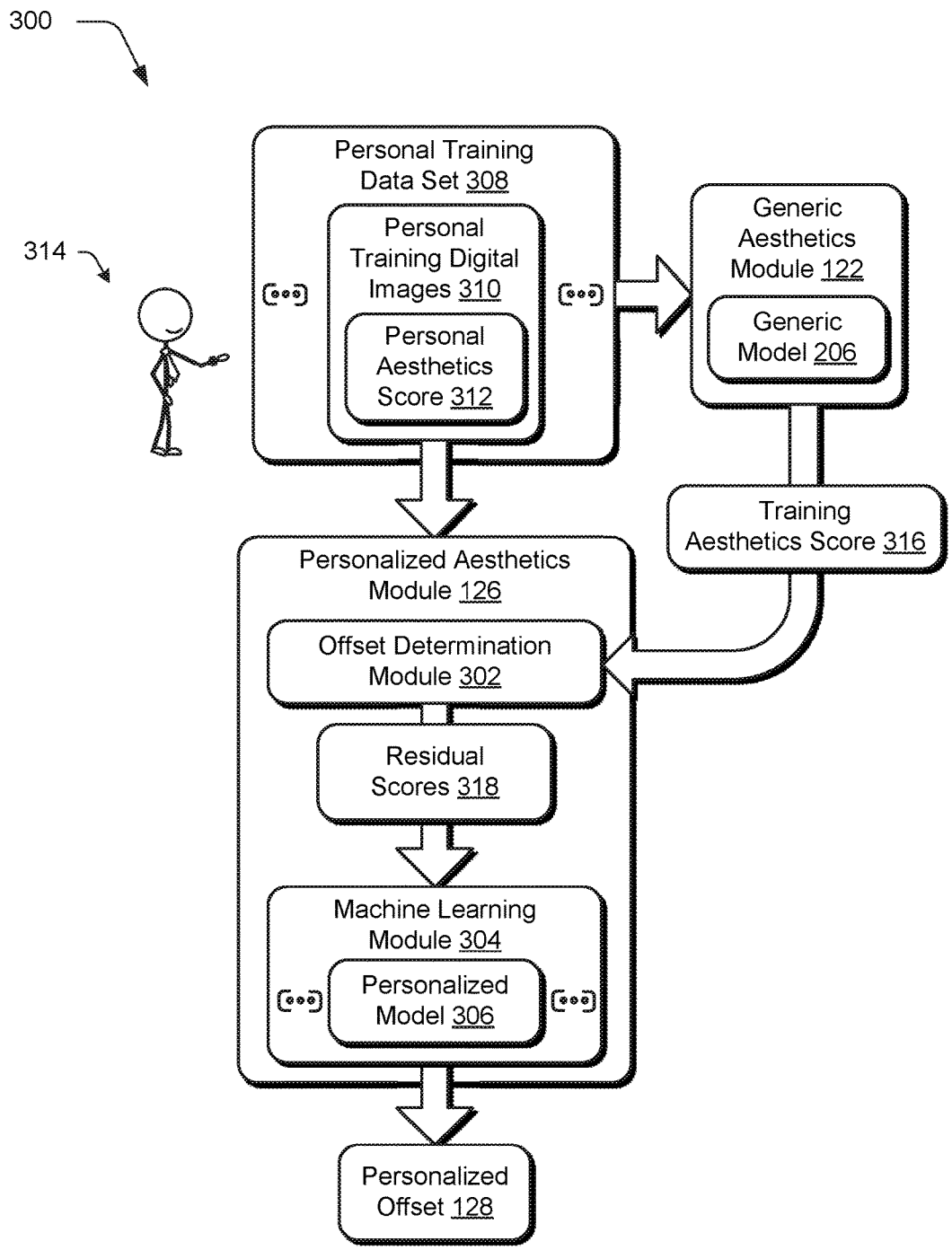
FIG. 3 depicts a system in an example implementation in which at least one personalized model is trained by a personalized aesthetics module of FIG. 1 using machine learning based on a personal training data set and the generic model of FIG. 2.

As shown in FIG. 3, the personalized aesthetics module 126 includes an offset determination module 302 and a machine learning module 304 that are configured to train a personalized model 306 using machine learning to generate the personalized offset 128. To do so, a personal training data set 308 is received that includes personal training digital images 210 and respective personal aesthetics scores 312 as specified by an entity 314 (e.g., user or user group). The entity 314, for instance, may interact with a personal photo album and rank the personal training digital images 310 to provide the personal aesthetics scores 312. Like the user aesthetics scores 212 for the generic training data set 208, the personal aesthetics scores 312 may specify an overall rating for respective personal training digital images 310 or content or aesthetics attributes that are then used to generate respective ones of a plurality of personalized models 306.

The personal training data set 308 is also provided to the generic aesthetics module 122, which employs this data to generate training aesthetics scores 316 (block 404). The training aesthetics scores 316 thus describe aesthetics scores generated using the generic model 206 that has been trained on the generic training data set 208. Thus, the "training aesthetics scores 316" corresponds to the generic aesthetics score 124 of FIG. 2 generated by the generic aesthetics score generation module 214 using the already-trained generic model 206. The training aesthetics scores 314 are referred as such in this example to indicate the use of these scores in training the personalized model 306.

Residual scores 318 are then determined by the offset determination module 302 based on a difference between the training aesthetics scores 316 and personal aesthetics scores 312 associated with the personal training data set 308 by the entity 314 (block 406). The residual scores 318 thus describe how the personal aesthetics scores 312 specified by the entity 314 differ from the training aesthetics scores 316 generated by the generic model 206, e.g., an offset between these scores.

The determined residual scores 318 are then used by the machine learning module 304 to train at least one personalized model 306 based on the personal training digital images 310 to generate a personalized offset 128 for the entity 314 (block 408). In this way, the personalized model 306 is usable to determine differences of user preferences of the entity 314 with respect to the generic model 206 in a computationally efficient and accurate manner by leveraging both models.

The generic model 206 is thus adapted for use generating a personalized aesthetics score 120 for the entity 314 based on a personalized offset 128 generated by the personalized model 306. As a result, the richness and accuracy of the generic model 206 trained using a multitude to training digital images 210 (e.g., forty thousand) from a generic training data set 208 is adapted through use of a personal training data set 308 have a relatively limited size, e.g., a couple hundred images, through use of a residual-based model adaptation techniques. Thus, the generic model 206 may be used for a multitude of entities through training of respective personalized models 306 and limited personal training data set 308 sizes in a computationally efficient manner. This process may continue and include retraining of the generic model 206 and personalized model 306 to address changes in development of user aesthetics, e.g., when a detected amount of error is reached in the scores during testing. Further discussion of use of the generic and personalized models 206, 306 to generate the personalized aesthetics score 120 is described in the Personalized Aesthetics Score Generation section in the following discussion. A section including an Implementation Example then follows that describes use of aesthetic and content attributes as well as active learning.

Personalized Aesthetics Score Generation

Figure 4:
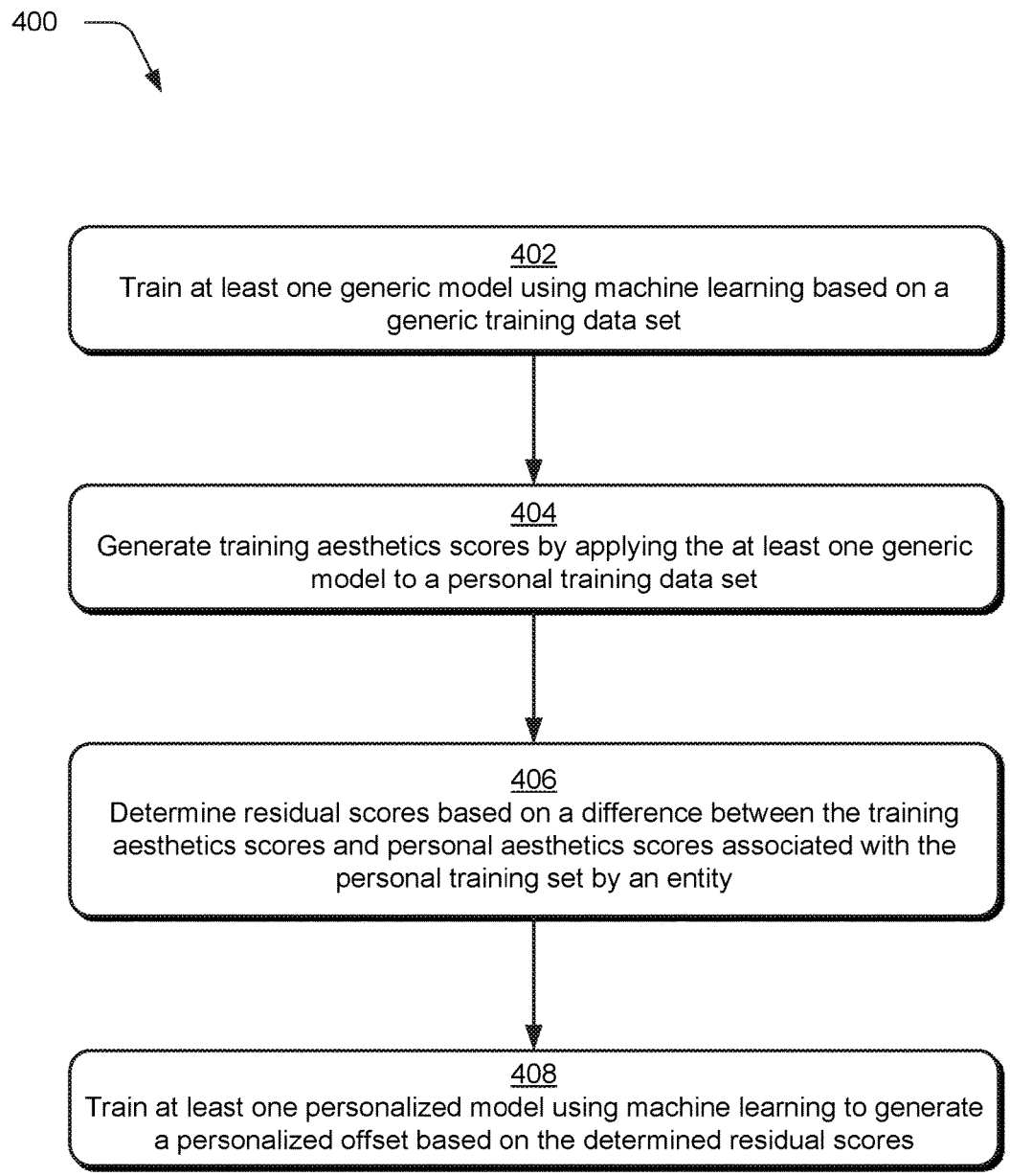
FIG. 4 is a flow diagram depicting a procedure in an example implementation of training generic and personalized models using machine learning.
Figure 5:
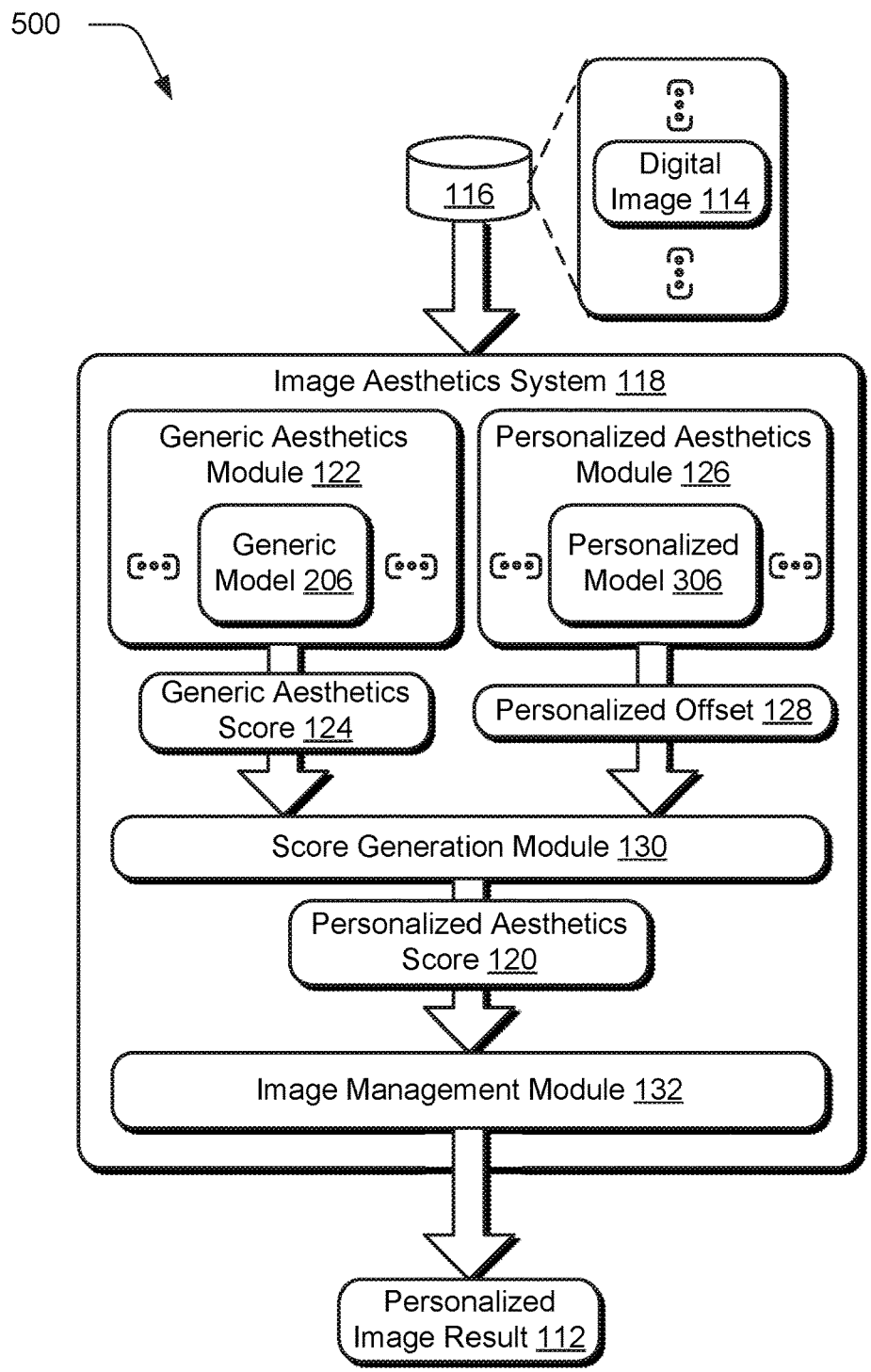
FIG. 5 depicts a system in an example implementation in which an image aesthetics system employs the generic and personalized models that are trained as described in relation to FIGS. 2-4 to generate a personalized aesthetics score, and from that, a personalized image result.
Figure 6:
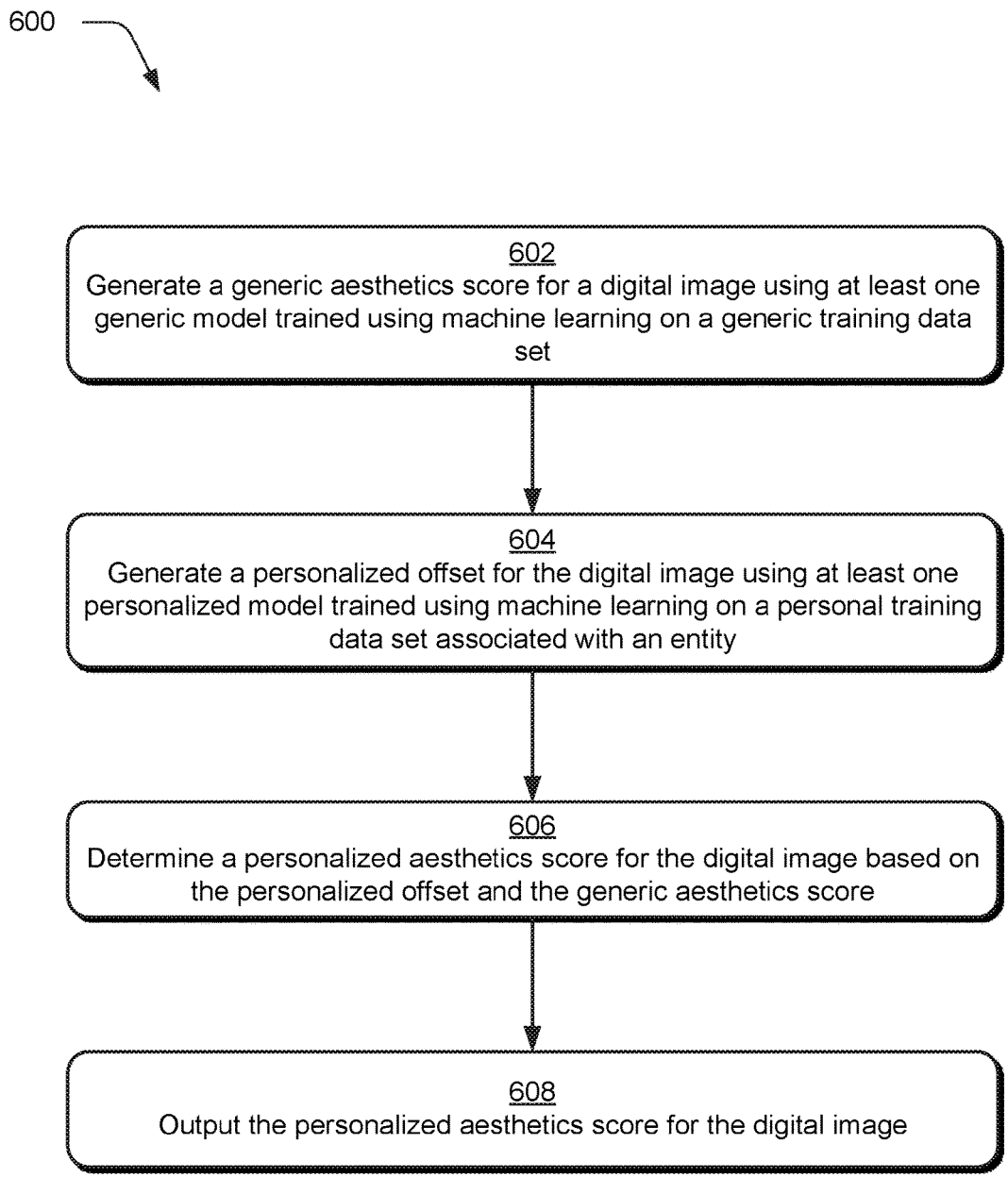
FIG. 6 is a flow diagram depicting a procedure in an example implementation in which a personalized offset generated by a personalized model is used to generate a personalized aesthetics score from a generic aesthetics score generated by a generic model.

FIG. 5 depicts a system 500 in an example implementation in which the image aesthetics system 118 employs the generic and personalized models 206, 306 that are trained as described in relation to FIGS. 2-4 to generate a personalized aesthetics score, and from that, a personalized image result. FIG. 6 depicts a procedure 600 in an example implementation in which a personalized offset generated by a personalized model is used to generate a personalized aesthetics score from a generic aesthetics score generated by a generic model.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 5-6.

In the illustrated example, digital images 114 are received sequentially by the image aesthetics system 118, for which, the personalized aesthetics scores 120 are to be generated. The digital images 114, for instance, may be part of an online image repository (e.g., a stock image databased or image search database) that may be stored by a single online service system or multiple online service systems.

A generic aesthetics score 124 is generated for a digital image 114 using at least one generic model 206 trained using machine learning on a generic training data set (block 602) by the generic aesthetics module 122. Thus, the generic aesthetics score 124 describes aesthetics of a group that originated user aesthetic scores 212 of the training digital images 210 of the generic training data set 208.

A personalized offset 128 is also generated for the digital image 114 using at least one personalized model 306 trained using machine learning on a personal training data set 308 associated with an entity 314 (block 604). Thus, the personalized offset specifies differences in aesthetics perceived by the entity 314 from the generic aesthetics trained by the generic model 206 from the generic training data set 208.

A personalized aesthetics score 120 is then determined for the digital image 114 based on the personalized offset 128 and the generic aesthetics score 124 (block 606), which is then output (block 608). In this way, the generic aesthetics score 124 may be adapted for personal use through user of the personalized model 306 and generated personalized offset 128. This may be used to support a variety of functionality, such as to generate a personalized image result 112 by the image management module 132. Examples of personalized image results 112 include image search results (e.g., a ranked order based at least in part on the scores), creative recommendations, image ranking, image curation (e.g., to generate photo albums), and so forth.

Implementation Example

Figure 7:
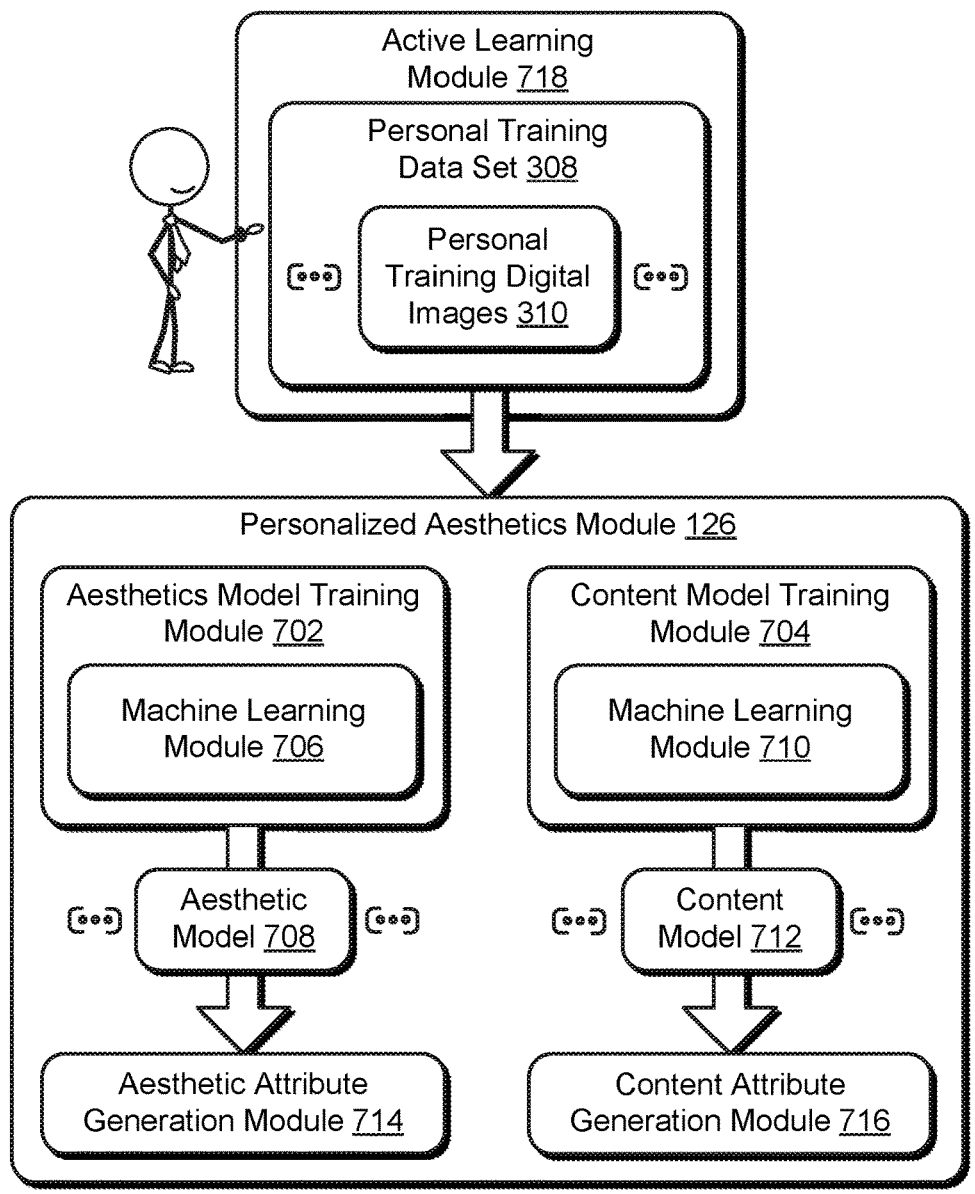
FIG. 7 depicts a system in an example implementation in which a personalized aesthetics module is used to train aesthetic models and content models as personalized models to address aesthetic and content attributes of digital images.
Figure 8:
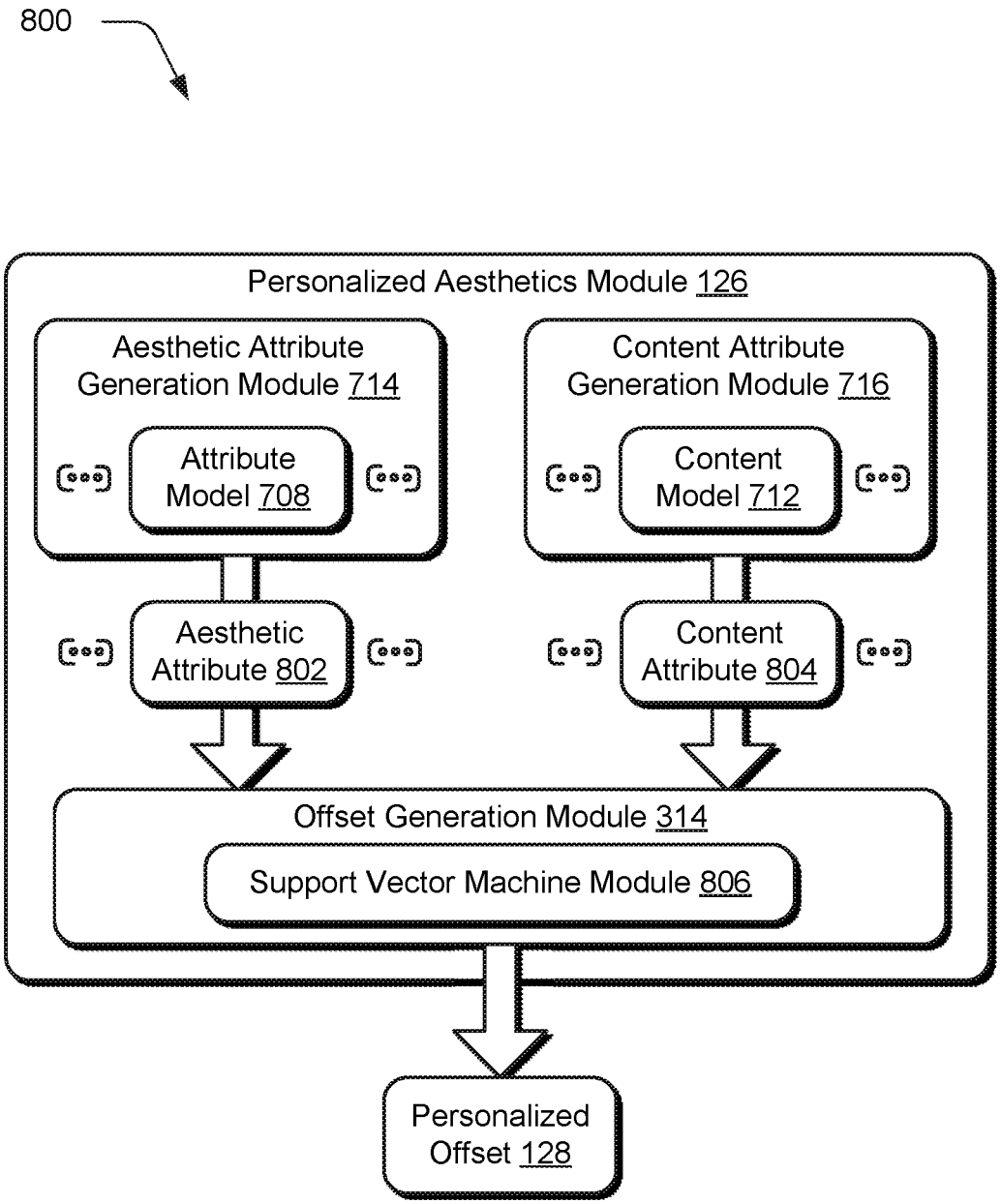
FIG. 8 depicts a system in an example implementation in which the aesthetic and content models are used to generate a personalized offset as part of a personalized model.

FIG. 7 depicts a system 700 in an example implementation in which a personalized aesthetics module 126 is used to train aesthetic models and content models as personalized models 306 to address aesthetic and content attributes of digital images. FIG. 8 depicts a system 800 in an example implementation in which the aesthetic and content models are used to generate a personalized offset 128 as part of a personalized model 306.

As previously described, automatic assessment of image aesthetics by a computing device supports a wide range of functionality, such as image search, creative recommendation, photo ranking and personal album curation, and so forth. It is a challenging task that involves a high-level understanding of photographic attributes and semantics of a digital image. Recent developments in machine learning (e.g., deep learning) have been achieved that can learn such high-level information effectively from training data. However, although deep learning-based approaches have been proposed for learning generic aesthetics, conventional techniques do not address personalized aesthetics. Accordingly, conventional digital image aesthetics techniques are unable to address the varied user opinions involving image aesthetics, i.e., differences in user taste regarding digital images. This challenge is exacerbated due to a limited size and availability of user examples that serve as a basis for machine learning in that these limited examples generally are not sufficient to train a model, by themselves, with sufficient accuracy to generate a personalized aesthetics score.

In this example, the personalized aesthetics module 126 employs an aesthetic model training module 702 and a content model training module 704. The aesthetic model training module 702 is configured to employ machine learning as part of a machine learning module 706 to train aesthetic models 708. The aesthetic models 708 are trained based on personal training digital images 310 of the personal training data set 308 and user ratings of different aesthetics attributes of digital images. Examples of aesthetics attributes include whether the digital image exhibits vivid color, good lighting, interesting content, symmetry, shallow depth of focus, object emphasis, balanced elements, color harmony, repetition, follows a rule of thirds, and so forth. Thus, each of the aesthetic models 708 may correspond to a respective aesthetic attribute.

Likewise, the content model training module 704 is configured to employ machine learning as part of a machine learning module 710 to train content models 712. The content models 712 are trained based on personal training digital images 310 of the personal training data set 308 and user ratings of different content attributes of the digital images. Examples of content attributes include whether the digital image includes a landscape, crowd, architecture, man-made structures, ocean/lake, transportation, people, plants or animals, sports, and so on. Thus, each of the content model 712 may correspond to a respective aesthetic attribute.

The aesthetic models 708 are then illustrated as input to an aesthetic attribute generation module 714 and the content models 712 to a content attribute generation module 716 to generate attributes as part of a personalized model, further description of which is included in the following discussion and described in relation to FIG. 8. In this way, a personalized model 306 is formed from aesthetic and content models 708, 712 to address features trained for generic aesthetics prediction, aesthetics attributes classification, and semantic content classification. This combined feature representation significantly outperforms conventional collaborative filtering-based techniques in practice.

In real-world photo ranking and curation applications, there is typically a lack of labeled examples of aesthetic ratings or feedback examples, e.g., personal aesthetics scores 312 for personal training digital images 310. The lack of labeled examples makes it difficult to train a meaningful personalized model from scratch, i.e., solely from these examples. Conventional recommendation-based approaches such as collaborate filtering are not effective due to a requirement of significant number overlapping of items rated by different users. Thus, in an image curation example, a user-item matrix may be too sparse to learn effective latent vectors and thus lacks accuracy.

Accordingly, the image aesthetics system 118 is configured to capture not only the common aesthetic preference shared across individuals via the generic training data set 208 and corresponding generic model 206 but also the unique aesthetic preference by each individual entity 314. As described above, this is performed by modeling the deviation (i.e., residual) of personal aesthetics scores 312 from the training aesthetics scores 316 of the generic model 206. The generic model 206, for instance, is first trained on the generic training data set 208, in which an average user aesthetic scores 212 for each of the training digital images 210 is treated as the ground truth. Then, given an example personal training data set 308 rated by the entity 314, the generic model 206 is applied to each personal training digital image 310 in the set to compute the residual scores 318. The residual scores 318, for instance, describe a difference between training aesthetics scores 316 generated by the generic model 206 and personal aesthetics scores 312 as part of the personal training data set 308. The personalized model 306 is then trained as a regression model to predict the residual scores 318 from subsequent digital images.

In an implementation, the generic model training module 202 is configured to train the generic model 206 using a deep neural network to predict genetic scores. It has an architecture as described by S. Ioffe and C. Szegedy. "Batch normalization: Accelerating deep network training by reducing internal covariate shift." arXiv preprint arXiv: 1502.03167, 2015, except that the number of neurons in the second-to-the last layer is reduced. This has been found to increase training efficiency and accuracy. Additionally, a Euclidean loss function is used.

The offset determination module 302 is configured to compute residual scores (offsets) 318 for the example images by subtracting the scores from personal aesthetics scores 312, e.g., ratings by each user. The machine learning module 304 then trains the personalized model 306 to learn a regressor to predict the residual score given any subsequent digital image. Due to the lack of annotated examples from each user, training the regressor directly from a set of digital images may not practical in some instances. Therefore, in such instances high-level image attributes related to image aesthetics are used to form a compact feature representation for residual learning.

In the illustrated example 800 of FIG. 8, aesthetic both aesthetic and content attributes 802, 804 are learned using the aesthetic model 708 and content model 712, respectively. Using these attributes, a support vector machine module 806 is used to implement a support vector regressor with a radial basis function kernel to predict the residual score as shown in the following equation:

$$\min \frac{1}{2}w^T w + C\left(v\epsilon + \frac{1}{l}\sum_{i=1}^{l}(\xi_i + \xi_i^*)\right)$$

$$\text{s.t.} \quad (w^T \phi(x_i) + b) - y_i \leq \epsilon + \xi_i,$$
$$y_i - (w^T \phi(x_i) + b) \leq \epsilon + \xi_i^*,$$
$$\xi_i, \xi_i^* \geq 0, i = 1, \ldots, l, \epsilon \geq 0.$$

where $x_i$ is the concatenation of aesthetic attribute features and content features, $y_i$ is the target offset value, C is the regularization parameter, and v (0<v≤1 controls the proportion of the number of support vectors with respect to the number of total training images.

In an implementation, a data set of approximately 10,000 digital images that are labeled with ten aesthetic attributes are used to train on aesthetic attributes 802. Due to the limited number of personal training digital images 310, the generic model 206 is pre-trained using the generic training data set 208 and modified using multi-task training, e.g., attribute and aesthetics prediction. Euclidean loss is used for both attribute prediction and aesthetics prediction, the earlier layers of the generic model are fixed with its last shared inception layer and the prediction layers of a deep learning neural network are tuned using the personal training data set 308. Given the tuned neural network, ten-dimensional responses are used as the aesthetic attributes feature vector $f_{attr}$.

As for the content features, an image classification neural network is used to extract semantic features (e.g., average pool) from each digital image. In order to generate compact content attribute features, a k-means cluster techniques is used to cluster the digital images from a training set into k=10. Semantic categories using the second-to-the-last inception layer are output as the feature. A k-way "softmax" layer is added on top of the network and fine-tuned using a cross-entropy loss. The ten-dimensional outputs of the network are defined for the content attributes 804 as a feature vector $f_{cont}$. The two feature vectors $x=[f_{attr}, f_{cont}]^T$ are concatenated to form a final feature representation to personalized aesthetics learning. In practice, it has been shown that the concatenation of attributes and content features achieve greater accuracy than using each of the attributes alone.

In real-world applications (e.g., interactive photo curation), user inputs may be continuously received that specify ratings regarding aesthetics preference during the photo selection and ranking process. Instead of waiting for user inputs to provide ratings on arbitrary images, active learning may be employed by an active learning module 718 to automatically select the most representative images for users to rate, and learn from their feedback online to form the personal training data set 308. To minimize the user effort, the active learning algorithm implemented by the active learning module 718 may optimize sequential selection of training images for personalized aesthetics learning. Specifically, two criteria may be employed as part of selection of digital images for ranking by a user (e.g., active learning): 1) the selected digital images cover diverse aesthetic styles while minimizing redundancy; and 2) the images with large residual scores between user's ratings (e.g., personal aesthetics scores 312) and the training aesthetics scores 316 are more informative.

Based on these criteria, the active learning module 718 is configured as follows. For each image $p_i$ in the collection N, its aesthetics score predicted by the generic model 206 is denoted as si, and features extracted at the second-to-the-last layer output as $f_i$. The aesthetic feature capturing the aesthetic styles of the digital image are then represented as $v_i = [w_a f_i, s_i]$, where $w_a$ is a constant balancing the two terms. The distance is measured by the active learning module 718 between any two images $p_i$ and $p_j$ using the Euclidean distance $\text{dist}(v_i, v_j)$. Given a set of images R already annotated by an entity 314, for each remaining image $p_i$ in the album, the sum of distances is calculated between pi and any digital image as follows:

$$d_i = \sum_{j=1}^{|R|} \text{dist}(v_i, v_j), p_j \in \mathcal{R}.$$

At each step, the active learning module 718 selects the digital image with the largest di according to the first criterion. In order to incorporate the second criterion at the same time, the active learning module 718 is encouraged to select digital images that produce large residuals in R. The residual score is denoted as $r_j$ and assign weight $w_j$ to each image in equation (2) of FIG. 9. The weights are then applied to the overall distance in equation (3) of FIG. 9. Details of the active learning algorithm 900 are described in further detail in FIG. 9.

Active learning techniques may be used to boost machine learning efficiency by selecting the most informative subset as a training data set from a pool of unlabeled samples. Conventional active learning techniques deal with classification problems, whereas in the techniques described herein the active learning module predicts a continuous aesthetic score, which is formulated as a regression problem. Conventional active classification techniques are not directly applicable to the techniques described here because evaluation of uncertainties for unlabeled samples is nontrivial in regression methods such as support vector regression. Moreover, there is a risk of selecting samples that are not informative, which may increase the cost of labeling. The active learning described herein differs from conventional techniques in that an objective function is defined to select unlabeled digital images by considering the diversity and the amount of information exhibited by the digital images that are directly related to personalized aesthetics.

Example System and Device

Figure 10:
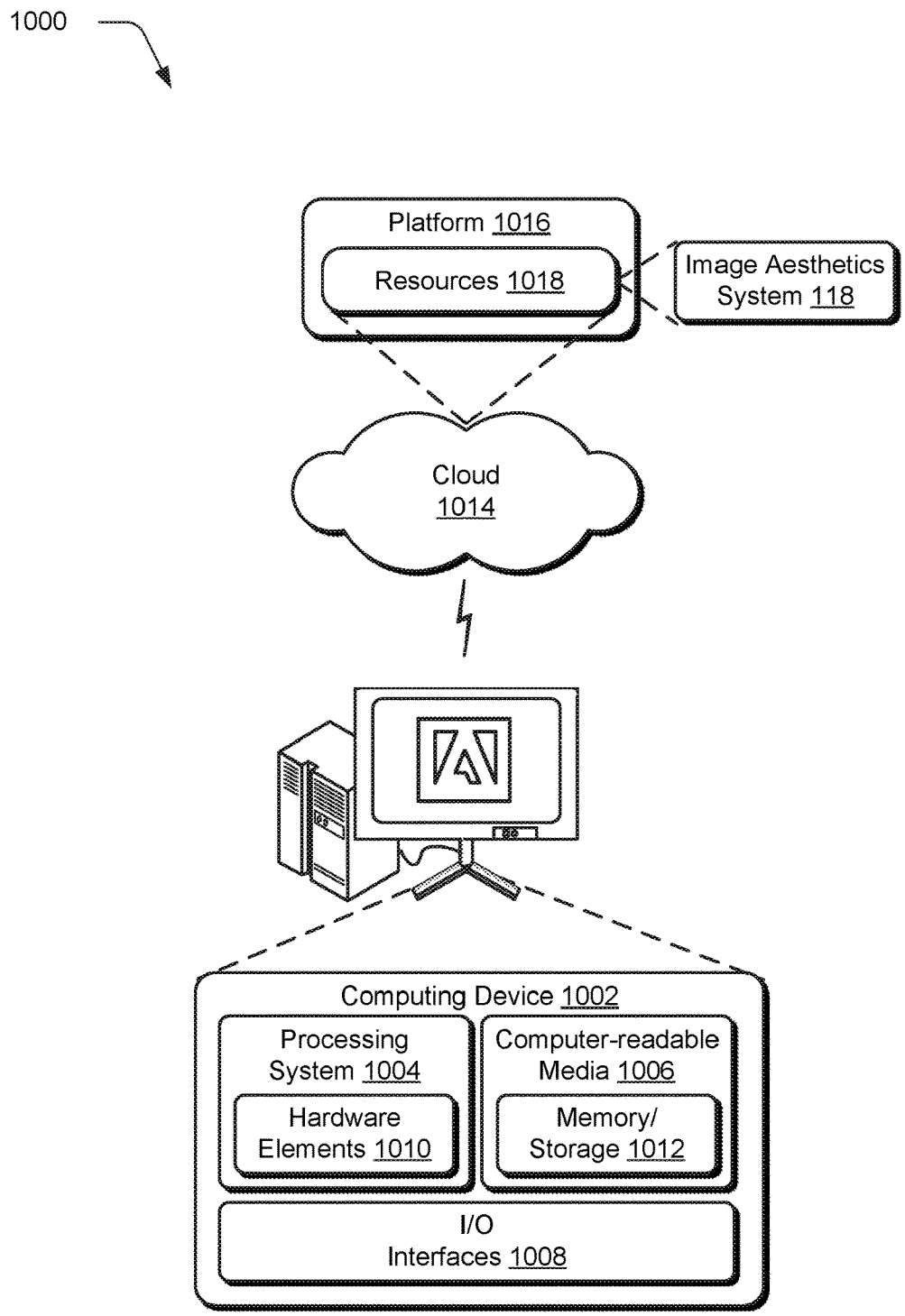
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the image aesthetics system 118. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for personalized digital image aesthetics, a method implemented by at least one computing device, the method comprising:
    generating, by the at least one computing device, a generic aesthetics score for a digital image using at least one generic model trained using machine learning on a generic training data set;

generating, by the at least one computing device, a personalized offset for the digital image using at least one personalized model trained using machine learning on a personal training data set associated with an entity;

determining, by the at least one computing device, a personalized aesthetics score for the digital image based on the personalized offset and the generic aesthetics score; and outputting, by the at least one computing device, the personalized aesthetics score for the digital image.

2. The method as described in claim 1, wherein: the at least one personalized model is trained using machine learning based on a deviation of a personal aesthetics score with respect to a training aesthetics score;

the personal aesthetics score is specified by the entity as part of the personal training data set; and the training aesthetics score is generated by the at least one generic model from the personal training data set.

3. The method as described in claim 1, wherein the generating of the personalized offset includes:

extracting content attributes from the digital image using at least one content model, of the at least one personalized model, trained using machine learning on the personal training data set;

extracting aesthetic attributes from the digital image using at least one aesthetic model, of the at least one personalized model, trained using machine learning on the personal training data set; and generating the personalized offset for the entity based on the extracted content attributes and the extracted aesthetic features using machine learning.

4. The method as described in claim 3, wherein the generating of the personalized offset includes applying a support vector machine on the extracted aesthetic attributes and the extracted content attributes.

5. The method as described in claim 1, wherein the personal training data set is configured by automatically selecting representative personal training digital images from a plurality of personal training digital images using active learning, each of the plurality of personal training digital images are associated with a personal aesthetics score specified by the entity through interaction with a user interface.

6. The method as described in claim 5, wherein the active learning includes selecting the representative personal training digital images automatically and without user intervention, by the at least one computing device, based on aesthetic style diversity and reduction in redundancy.

7. The method as described in claim 5, wherein:

the active learning includes selecting the representative personal training digital images automatically and without user intervention by maximizing a deviation of the personal aesthetics scores with respect to training aesthetics scores; and the training aesthetics scores are generated by the at least one generic model using machine learning based on the plurality of personal training digital images.

8. The method as described in claim 1, further comprising generating a personalized image result based at least in part on the personalized aesthetics score for a plurality of said digital images.

9. The method as described in claim 8, wherein the personalized image result is part of image curation or an image search result.

10. In a digital medium environment to support personalized digital image aesthetics training, a system comprising:

a generic aesthetics module implemented at least partially in hardware of a computing device to generate training aesthetics scores from a personal training data set using a generic model trained using machine learning on a generic training data set;

an offset determination module implemented at least partially in hardware of the computing device to determine residual scores based on a difference between the training aesthetics scores and respective user-specified personal aesthetics scores associated with the personal training set; and a machine learning module implemented at least partially in hardware of the computing device to train at least one personalized model using machine learning to generate a personalized offset based at least in part on the determined residual scores.

11. The system as described in claim 10, further comprising an active learning module to generate the personal training data set by:

automatically selecting representative training digital images from a plurality of training digital images; and obtaining the user-specified personal aesthetics scores from the entity via a user interface for the selected representative training digital images.

12. The system as described in claim 11, wherein the active learning module selects the representative training digital images automatically from the plurality of training digital images based on aesthetic style diversity and reduction in redundancy.

13. The system as described in claim 11, wherein the active learning module selects the representative training digital images by maximizing a deviation of the personal aesthetics scores with respect to training aesthetics scores generated by the at least one generic model as applied to the plurality of training digital images.

14. The system as described in claim 10, further comprising an image management module to generate a personalized image result based at least in part on a personalized aesthetics score generated from a personalized offset for a subsequent digital image by the at least one personalized model using machine learning.

15. The system as described in claim 10, wherein the offset determination module is configured to generate of the personalized offset by:

extracting content attributes from the digital image using at least one content attribute model trained using machine learning on the personal training data set;

extracting aesthetic attributes from the digital image using at least one aesthetic attribute model content trained using machine learning on the personal training data set; and generating the personalized offset using machine learning based on the extracted content attributes and the extracted aesthetic features.

16. In a digital medium environment for personalized digital image aesthetics, a system comprising:

means for generating a generic aesthetics score for a digital image using at least one generic model trained using machine learning on a generic training data set;

means for generating a personalized offset for the digital image using at least one personalized model trained using machine learning, the generating means including:

means for extracting content attributes from the digital image using at least one content attribute model, of the at least one personalized model, trained using machine learning on a personal training data set;

means for extracting aesthetic attributes from the digital image using at least one aesthetic attribute model, of the at least one personalized model, trained using machine learning on the personal training data set; and means for generating the personalized offset for the entity based on the content attributes and the aesthetic features using machine learning; and means for determining a personalized aesthetics score for the digital image based on the personalized offset and the generic aesthetics score.

17. The system as described in claim 16, wherein:

the at least one personalized model is trained using machine learning based on a deviation of a personal aesthetics score with respect to a training aesthetics score;

the personal aesthetics score is specified by the entity as part of the personal training data set; and the training aesthetics score is generated by the at least one generic model from the personal training data set.

18. The system as described in claim 16 further comprising means for active learning to automatically select representative personal training digital images from a plurality of personal training digital images, each of the plurality of personal training digital images are associated with a personal aesthetics score specified by the entity through interaction with a user interface.

19. The system as described in claim 18, wherein the active learning means includes selecting the representative personal training digital images automatically and without user intervention based on aesthetic style diversity, reduction in redundancy, or to maximize a deviation of the personal aesthetics scores with respect to training aesthetics scores, the training aesthetics scores generated by the at least one generic model using machine learning based on the plurality of personal training digital images.

20. The system as described in claim 16, wherein the generating means includes means for applying a support vector machine on the extracted aesthetic attributes and the extracted content attributes.

* * * * *